Figure 1:
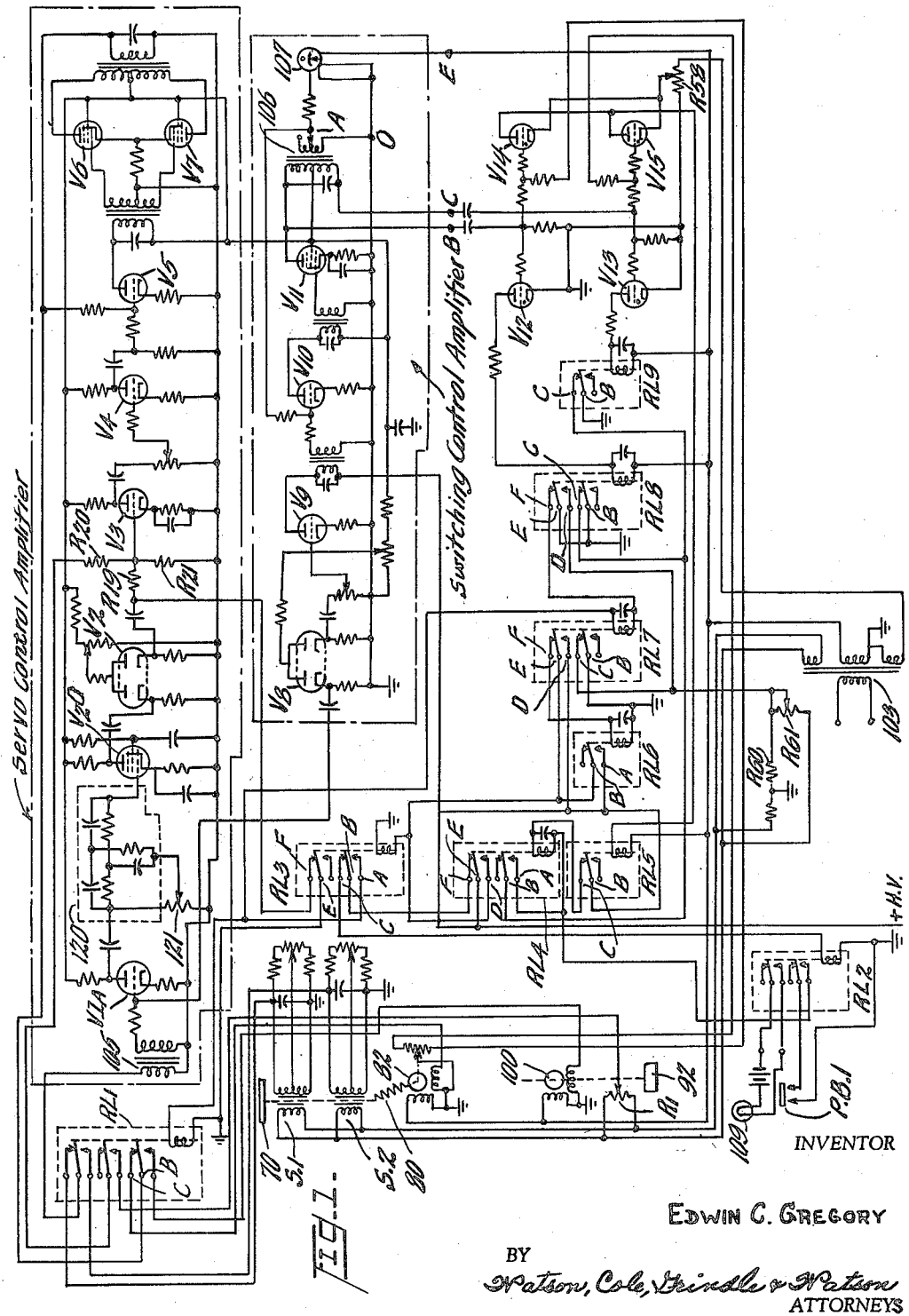

April 8, 1958     E. C. GREGORY     2,829,856
WEIGHING AND FEEDING CONTROL SYSTEM
Filed June 19, 1956     2 Sheets-Sheet 1

INVENTOR
EDWIN C. GREGORY
BY
Watson, Cole, Grindle & Watson
ATTORNEYS

April 8, 1958 E. C. GREGORY 2,829,856
WEIGHING AND FEEDING CONTROL SYSTEM
Filed June 19, 1956 2 Sheets-Sheet 2

INVENTOR

EDWIN C. GREGORY

BY
Watson, Cole, Grindle & Watson
ATTORNEYS ited States Patent Office 2,829,856
Patented Apr. 8, 1958

2,829,856

WEIGHING AND FEEDING CONTROL SYSTEM

Edwin C. Gregory, Evansville, Ind.

Application June 19, 1956, Serial No. 592,309

10 Claims. (Cl. 249—63)

This invention relates to apparatus for use in the weighing, feeding, and packaging of solid material in divided form, and especially of free flowing powdered or granular material, liquids, slurries and the like, and finds its principal use in the filling of containers with accurately measured amounts by weight of such material. It is the primary object of the invention to provide apparatus of the class indicated in which the feeding or pouring into containers of the material in measured amount is effected automatically and with unusual accuracy. The invention is especially effective when used in conjunction with weighing and feeding control systems of the type described and claimed in my copending application for U. S. Letters Patent, Serial No. 385,467, filed October 12, 1953, now Patent 2,763,457, and is so illustrated and described herein.

In the preferred embodiment of the invention of my copending application aforesaid, hereinafter referred to as the net weight system, the weight of the empty container is first determined with accuracy, and due compensation for variation from an average or standard weight is effected, preferably by restoring the scale platform to a predetermined position, for instance its initial unloaded position, whereupon a measured amount of material is automatically fed into the container, the feeding rate being controlled throughout the feeding cycle in such manner as to insure delivery to the container of a precise predetermined total amount by weight thereof, whereupon feeding is automatically terminated.

In a further embodiment of the invention of my copending application, hereinafter referred to as the gross weight system, the determination of the weight of the empty container is omitted, the apparatus being restricted essentially to such elements as are required for delivery of the material from a source into a container or onto a scale pan or the like until a predetermined gross weight is established.

A feature of the systems disclosed in my copending application is the establishment of a feeding cycle involving (a) the feeding of material at a maximum predetermined rate during the first and major portion of the cycle, (b) progressive and gradual reduction of the feeding rate to zero during the latter portion of the feeding cycle, and (c) the reinitiation and subsequent termination of feeding for the purpose of delivering a measured small quantity of material in the event the total quantity of material required has not been fed prior to such reinitiation of feeding, whereby the effects of inertia of the moving material and of the moving parts of the apparatus are minimized or eliminated.

Prior art systems for automatic filling of containers usually rely for accurate measurement of the material on the "dribble" method of controlling feed, in which nearly all of the material is charged to the container at a fixed maximum rate, the rate of feed being then abruptly reduced to a constant minimum rate which is terminated when the container weight is approximately correct. However, since the material cannot be measured accurately while flowing at the maximum rate, owing to variation in operating conditions and in the character of the material being fed, dribbling of the final measured amount must be prolonged somewhat to allow adequate compensation for error in the feeding at the maximum rate. It can be shown, therefore, that the systems of my copending application, employing a feeding cycle of the character hereinbefore indicated, result in quicker and more accurate charging of containers, especially when provision is made for continuous coordination of the rate of progressive reduction of feed with the weight of material in the container.

A further feature of the aforesaid net weight system is the provision of means whereby the filling of a container is automatically prevented whenever the weight of the container falls outside of predetermined limits, and of means whereby variation of container weight within such predetermined limits is detected and duly compensated, whereby the final weight of the filled container may be used to determine automatically the amount of material charged to the container regardless of minor variation in container weight.

In my patent, mentioned above, the filling operation is responsive primarily to the position of the scale platform, the signal delivered to the amplifiers to effect control of the filling operation having an effective value varying with the extent of platform displacement. In the present invention it is proposed to develop and apply to the filling valve operating mechanism a further signal varying directionally with the velocity or rate of displacement of the scale platform. In the preferred embodiment of the instant invention, this further signal is derived from the signal representative of displacement by passing the latter through a differentiating network, the two signals being then combined whereby correction for variation in displacement due to any irregularity in flow of material is immediately effected. It will be appreciated that where continuous correction of this character is applied, the filling operation may be conducted with the utmost precision, and the filling time may be substantially shortened without impairment of accuracy of measurement, correction required at the end of the filling operation being reduced to the barest minimum.

It is, accordingly, an object of the present invention to provide, in a weighing and feeding control system of the general character described and claimed in my copending application, means responsive, at least in part, to the rate of depression of the scale platform to effect adjustment of the rate of filling of a container.

More specifically, it is an object of the invention to provide electronic control of the rate and duration of filling of a container, in such manner that the rate of filling is determined in part by the displacement of the scale platform and in part by the rate of displacement of the scale platform.

Figure 2:
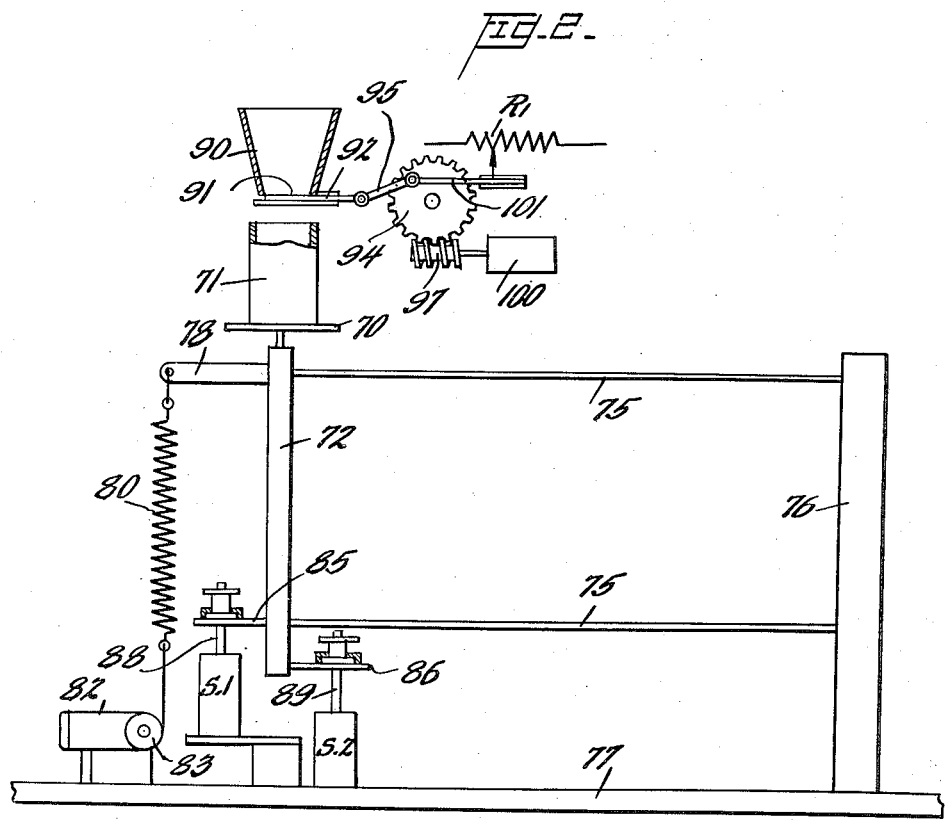

Further objects and features of the invention will be apparent from the following description, taken in connection with the accompanying drawings, in which Figure 1 is a wiring diagram of a net weight system of the type described and claimed in my patent mentioned above, and principles of the present invention;

Figure 2 is a diagrammatic representation of certain components of the system shown in Figure 1, showing mechanical connections therebetween.

For the purpose of promoting an understanding of the principles of the invention, reference will now be made to the embodiments illustrated in the drawing, and specific language will be used to describe the same. It will nevertheless be understood that no limitation of the scope of the invention is thereby intended, such alterations and further modifications in the illustrated apparatus, and such further application of the principles of the invention as illustrated therein, being contemplated as would normally occur to one skilled in the art to which the invention relates.

Referring first to Figure 2, in which is illustrated in a simple manner the physical relationship of certain components of my system, there is shown at 70 a scale platform or weighing pan on which may be placed a container 71 to be charged with a measured amount of material. Platform 70 is supported on a pedestal 72 which is mounted for substantially vertical displacement on a pair of spring beams 75, the beams being anchored at their opposite ends on an upright support 76 mounted on a base 77, the beams 75 functioning essentially as a parallel linkage, whereby the pedestal 72 is maintained in an upright position, vertical displacement of the pedestal in response to a load on platform 70 being yieldingly resisted by the resilience of the beams. To an arm 78, rigid with pedestal 72, is secured a bias spring 80, the tension exerted by spring 80 being varied by operation of rebalancing servomotor 82, which drives a reel 83 to which the lower end of spring 80 is peripherally connected. It will be appreciated that when servomotor 82 is energized to rotate reel 83 in a counterclockwise direction, the spring 80 is relaxed and the pedestal 72 and scale platform 70 are permitted to rise proportionately. Operation of motor 82 in a direction to increase the tension of spring 80 tends to depress the platform 70 against the action of spring beams 75. The structure thus far described is conventional in systems of this character, and the details thereof form no part of the invention, but may be modified as desired.

Upon vertical displacement of platform 70 and pedestal 72, the moving elements of each of two weight sensing devices S.1 and S.2 are correspondingly displaced. To this end, the lower end of pedestal 72 is provided with laterally extending arms 85 and 86; rods 88 and 89, each coupled for displacement with the moving element of one of the weight sensing devices, are adjustably connected in any convenient manner to these arms. The simple form of adjustable connection shown in the drawing for the purpose of illustration may, of course, be replaced by equivalent and more complex types of connection, designed to afford accurate adjustment of the position of the moving elements of the sensing devices corresponding to any given position of the platform 70. Each of the sensing devices may be constituted by a variable impedance of a known type, more specifically, a linearly variable differential transformer, such as illustrated by conventional electrical symbols in Figure 1, and is so connected in a circuit as to develop a signal of which the absolute value and the phase relationship is determined by the position of its moving element, whereby the signal output is representative of the position of the scale platform 70, in a manner readily understood in the art to which the invention relates. Motor 82 and sensing devices S.1 and S.2 may be mounted rigidly on base 77.

Scale platform 70 is positioned immediately below a hopper 90, adapted to receive the material to be charged into the containers 71, the hopper having an opening 91 at its lower end which is controlled by a gate valve 92, supported to slide transversely of the opening. Control means for displacing gate valve 92 to control discharge of material from hopper 90 is schematically shown as comprising crank disk 94 and connecting rod 95, the latter being pivotally connected to valve 92. Crank disk 94 may be driven by worm 97 which is rotated by control valve servomotor 100. Again it will be appreciated that, in order to simplify the illustration, an elementary form of driving connection between the motor 100 and the gate valve 92 has been selected, and that these are conventional details which may be modified as desired. A potentiometer R1 is connected for adjustment in response to displacement of gate valve 92, for instance by coupling the movable element of the potentiometer to disk 94 by a link 101, whereby the potentiometer resistance is varied as the position of the valve is altered by energization of servomotor 100. Potentiometer R1 is employed, as hereinafter more fully explained, to supply a potential varying as the position of gate valve 92 is altered, and approximating zero when the valve is just closed. A variable resistor R2 is connected for adjustment in response to displacement of rebalancing servomotor 82, as schematically shown, for a purpose hereinafter explained.

Referring now to Figure 1 of the drawing, it will be noted that weight sensing devices S.1 and S.2 each comprises a differential transformer of which the primary winding is energized from an A. C. source by transformer 103, as is also potentiometer R1. Sensing device S.1, hereinafter referred to as the initial sensing device, is used for the primary purpose of energizing rebalancing servomotor 82 to compensate for variation in weight of the container; sensing device S.2 and potentiometer R1 deliver potentials which may be applied in opposed phase relation to energize the control valve servomotor 100 to effect the delivery to the container of an accurately measured quantity of material by displacement of gate valve 92. The physical connections of the several components, illustrated in Figure 2, are represented schematically in Figure 1. The energy output of sensing devices S.1 and S.2, with each of which is associated a conventional balancing network, together with the energy output of potentiometer R1, are supplied to switching relay RL1 which, when de-energized, transmits to a servo control amplifier, hereinafter described, the output of initial weight sensing device to S.1, and which, when energized, transmits to the same amplifier the outputs of final weight sensing device S.2 and potentiometer R1. The following brief description of the principal elements of the amplifier, which is largely conventional, should suffice for an understanding of its function.

The output voltage from the selected sensing device S.1 or S.2, hereinafter called an error signal voltage, is applied by relay RL1 through a step-up input transformer 105 to the grid of voltage amplifier, tube V1A. The amplified error signal voltage obtained from the output of vacuum tube V1A is applied through a differentiating circuit or carrier frequency null network 120 to the input of vacuum tube V20. The differentiating circuit 120 may be of conventional design and the details thereof form no part of the instant invention. For instance, I may employ a parallel-T network of the type represented in Figure 3.22(a) of the publication "Theory of Servomechanisms," James, Nichols and Phillips (1947), page 118, and such a network is shown in the drawing for purpose of illustration. It will be observed that one terminal of the network 120 is connected to the plate of tube V1A and a second terminal is connected to potentiometer 121. This circuit arrangement mixes a portion of the unmodified error signal with the derivative of the error signal and enables their ratio to be adjusted. The signal delivered to further components of the servo control amplifier is thus partly representative of displacement and partly representative of velocity of the scale platform.

From network 120, the signal is fed to a multi-grid vacuum tube V20 and the signal thus amplified is applied to vacuum tube V2, which is an amplitude limiter and is used to limit the selected error signal voltage to a maximum amplitude equal to that provided by potentiometer R1 when the gate valve 92 is in the wide open position. The signal from vacuum tube V2 (and the output from potentiometer R1 when the error signal is derived from sensing device S.2) are applied, respectively, to a mixer circuit network comprising resistors R19, R20 and R21. The output of the mixer network is applied to the grid of vacuum tube V3. Vacuum tubes V3, V4, V5, V6 and V7 with associated components comprise a conventional servo amplifier. The output voltage obtained from the servo amplifier is switched by relay RL1 either to the rebalancing servomotor 82 (when sensing device S.1 is operative) or to the control valve servomotor 100 (when sensing device S.2 and potentiometer R1 are operative).

The error signal obtained from transformer 105 is also applied to the input tube V8 of a switching control amplifier. Vacuum tube V8 is an amplitude limiter used to prevent overloading of the control amplifier. The signal from the output of vacuum tube V8 is applied to the grid of vacuum tube V9. Vacuum tubes V9, V10, and V11 comprise a conventional amplifier with a center tapped primary output transformer 106. The signal from the secondary of the output transformer may be used to power an error meter 107, if desired. The signal from either side of the center tapped primary of the control amplifier output transformer (points B and C) is applied to the grids of thyratron tubes V12, V13, V14 and V15, which are employed to effect sequential operation of various switching relays, hereinafter described.

In the net weighing operation, the phase of the output from sensing device S.1 is determined by the relative weights of the empty container on the platform and the empty container weighed and filled in the immediately preceding operation, so that the rebalancing servomotor 82 is energized to run in the proper direction, the correction being effected in one direction if the empty container is of less weight, and in the opposite direction if the container is of greater weight than the container immediately preceding. Stated otherwise, the change from an over-weight voltage to an under-weight voltage results in a 180° phase reversal of the output of sensing device S.1, the container being either over-weight or under-weight as compared with the immediately preceding container.

The steady state error voltage from either weight sensing device is amplified without phase shift by the switching control amplifier and the amplifier circuit is so designed that the output voltage between A and O is held by tube V8 to a constant value for input error voltages in excess of a relatively low predetermined level, and is either in phase or 180° out of phase with the voltage between E and O.

The primary winding center tap of the switching control amplifier output transformer 106 is at ground potential for alternating current voltages. A high voltage must be obtainable between B and O and between C and O. The circuit is arranged so that the voltage between B and O is in phase with the voltage between E and O for over-weight error input voltages and 180° out of phase with the voltage between E and O for under-weight error input voltages. The voltage between C and O is always 180° out of phase with the voltage between B and O, due to transformer action. The voltage between B and O is connected through protective resistors to the control grids of thyratron tubes V12 and V14. The voltage between C and O is connected through protective resistors to the control grids of thyratron tubes V13 and V15.

Thyratrons V12 and V13 are operated with zero bias voltage and are used initially to detect the completion of the rebalancing cycle and finally to detect completion of the material filling cycle. Thyratrons V14 and V15 are operated with a cathode bias voltage, preselected by adjusting resistor R58, and are used to prevent recycling of the packaging control in the event the empty container is above or below the preset weight limits, as hereinafter described in more detail. If the container is within the desired preset weight limits, the above mentioned cathode bias voltage prevents thyratrons V14 and V15 from conducting. Current conduction by the thyratrons energizes their respective relays, the operation of which will now be discussed.

The schematic diagram of Figure 1 illustrates the condition of the relay contacts with all power off. With no plate power supplied to the system, with the electron tube heater elements hot and with A. C. power on the plates of the thyratrons, the coil of relay RL5 is de-energized; the coil of relay RL8 is energized; the coil of relay RL9 is energized and the coils of all other relays are de-energized.

With all power supplied, and with the weighing device balanced for the weight of an average weight empty container, and with the platform of the weighing device empty, the coil of relay RL1 is de-energized; the coil of relay RL2 is energized; the coil of relay RL3 is de-energized; the coil of relay RL4 is de-energized; the coil of relay RL5 is energized; the coil of relay RL6 is de-energized; the coil of relay RL7 is de-energized; the coil of relay RL8 is de-energized; and, the coil of relay RL9 is energized. Thyratrons V13 and V15 are conducting.

If the cycling switch, push button P.B.1, is closed at this time, nothing happens because thyratron V15 is conducting, energizing the coil of relay RL5.

With an empty container weighing less than the weight of an average weight container, but within the preselected weight tolerance determined by variable resistor R58, positioned on the receiving platform of the weighing device, the coil of relay RL1 remains de-energized; the coil of relay RL2 remains energized; the coil of relay RL3 remains de-energized; the coil of relay RL4 remains de-energized; thyratron V15 becomes nonconducting, which de-energizes the coil of relay RL5; the coil of relay RL6 remains de-energized; the coil of relay RL7 remains de-energized; the coil of relay RL8 remains de-energized; and the coil of relay RL9 remains energized. The control can be recycled since the coil of relay RL5 is de-energized.

If the cycling switch P.B.1 is closed at this time, the coil of slow opening relay RL4 energizes. Relay RL4 then remains energized because current continuity has been established through contacts B—C of relay RL5, through holding contacts A—B of relay RL4, and through contacts B—C of relay RL8, completing the circuit to ground.

The energization of relay RL4 also closes contacts D—E of relay RL4, thereby completing a circuit through the coil of relay RL3. Relay RL3 becomes energized. Since the coil of relay RL7 is de-energized when the contacts D—E of relay RL4 close, a circuit is completed through contacts E—F of relay RL7 and through the coil of slow opening relay RL6, energizing relay RL6. Relay RL3 remains energized by the continuity established through the closed contacts A—B of slow opening relay RL6.

The energization of either relay RL3 or relay RL4 de-energizes relay RL2, since contacts E—F of relay RL4 or contacts B—C of relay RL3 are broken, and hence the circuit through the coil of relay RL2 is broken. The de-energization of relay RL2 opens the circuit of ready signal 109 (closed at the termination of the previous filling cycle), and disables the cycling circuit completed through cycling switch P.B.1. Thereafter, any random or inadvertent use of the cycling switch P.B.1 will not influence the filling cycle.

Energizing relay RL3 removes the ground from the output signal of vacuum tube V2 in the servo control amplifier. Since the weight of the empty container is less than that of an average container in this illustration, the initial weight sensing device S.1 produces an under-weight error signal. The signal is amplified and applied to the control phase of the rebalancing servomotor 82 through relay contacts B—C of deenergized relay RL1. The signal causes the rebalancing servomotor to run in a direction to reduce the unbalance of the weighing device caused by the under-weight of the empty container. The unbalance error signal from the sensing device S.1 is reduced.

When the modified error signal has been reduced to zero, i. e., when the resultant of mixing a portion of the output voltage of the initial weight sensing device S.1 with its derivative equals zero, thyratron V12 conducts, energizing relay RL8. Contacts B—C of relay RL8 are broken when relay RL8 becomes energized and since relay RL9 was energized, opening contacts B—C of relay RL9, the ground on the coil of slow opening relay RL4 is removed. Relay RL9 is responsive to any under-weight conditions.

When an over-weight container, within the preselected limits, is placed on the platform of the weighing device, with the weighing device balanced for the weight of an average weight container, relay RL8 becomes energized and relay RL9 is de-energized. If the cycling switch P.B.1 is closed, the initial weight sensing device S.1 produces an over-weight error signal. The signal runs the rebalancing servomotor 82 in a direction to reduce the lack of balance occasioned by the over-weight empty container, as in the operation described above.

If an empty container equal in weight to an average weight empty container is placed on the platform with the weighing device balanced for the weight of an average container, a zero error signal will be obtained from the initial weight sensing device S.1. Thyratron V12 and thyratron V13 will conduct, energizing relay RL8 and relay RL9. If the cycling switch P.B.1 is closed at this time, the coil of slow opening relay RL4 energizes as generally described above. The holding circuit of relay RL4 is open, since the paralleled contacts B—C of relay RL8 and relay RL9 are open. Relay RL4, after a brief time delay, determined by the slow opening circuit of relay RL4, may now reopen. While relay RL4 is closed, the rebalancing servomotor 82 does not run because the error signal from the initial weight sensing device S.1 is zero.

The condition of all relay contacts immediately prior to de-energization of the coil of relay RL4, representing completion of the empty container rebalancing cycle for purposes of net weight filling are as follows: Relay RL1 is de-energized; relay RL2 is de-energized; relay RL3 is energized; relay RL4 is energized; relay RL5 is de-energized; relay RL6 is energized; relay RL7 is de-energized; relay RL8 is energized, and relay RL9 is energized.

If a container having a weight under the desired preselected weight limits of an average weight container, as preset by means of resistor R58, is placed on the platform of the weighing device, the control will not cycle when P.B.1 is closed because thyratron V15 will conduct, energizing relay RL5. The condition of the relays under such circumstances is as follows: Relay RL1 is de-energized; relay RL2 is energized; relay RL3 is de-energized; relay RL4 is de-energized; relay RL5 is energized; relay RL6 is de-energized; relay RL7 is de-energized; relay RL8 is de-energized; and relay RL9 is energized. Thyratrons V13 and V15 are conducting. To permit cycling, a container within the desired weight limits must be placed on the platform of the weighing device.

If a container whose weight is over the desired preselected weight limits of an average weight container, as preset by means of resistor R58, is placed on the platform of the weighing device, the control will not cycle when P.B.1 is closed because relay RL5 is energized. The condition of the relays under such circumstances is as follows: Thyratron V12 is conducting, thyratron V14 is conducting, relay RL1 is de-energized; relay RL2 is energized; relay RL3 is de-energized; relay RL4 is de-energized; relay RL5 is energized; relay RL6 is de-energized; relay RL7 is de-energized; relay RL8 is energized; and relay RL9 is de-energized. To permit cycling, a container within the desired weight limits must be placed on the platform of the weighing device.

The foregoing description of the net weighing operation assumes that the weighing device is initially balanced for the weight of an average weight empty container. However, upon the conclusion of net weighing and filling operations in which the container, although within the permissible tolerance is not of average weight, the variation of the container weight from the average has been compensated by tensioning or relaxing spring 80, and it is obviously undesirable to require the operator to restore the normal balance before weighing and filling the next succeeding container. Thus if a container is of less than average weight, spring 80 is tensioned by rebalancing servomotor 82 during the normal net weighing operation. Then if the succeeding container is of more than average weight, although within the permissible tolerance, it may nevertheless result in the transmission of an error signal from sensing device S.1 of sufficient magnitude to render V14 conducting; whereby relay RL5 is energized to prevent further cycling. To avoid this, variable resistor R2, mechanically coupled to rebalancing servomotor 82, is automatically adjusted during the preceding net weighing operation to supply a correcting bias to thyratrons V14 and V15 of the sense and magnitude required to compensate for the off-balance condition of the weighing device.

The effect on the net weighing operation, just described, of the differentiating circuits 120 and 125 is essentially one of dampening, overrunning of the rebalancing servomotor 82 being minimized, so that a stable condition may be reached more rapidly and more accurately.

As soon as relay RL4 is de-energized, the filling cycle is initiated as follows: When relay RL4 is de-energized, contacts E—F of relay RL4 are closed, thereby supplying power through the closed contacts A—B of relay RL3, which is energized, to the coils of relays RL1 and RL7. Relay RL1 is energized. Relay RL3 remains energized since power is supplied to the coil of relay RL3 through the closed contacts A—B of the slow opening, already energized relay RL6. Relay RL6 is maintained in an energized condition by power supplied to the coil of relay RL6 through relay contacts E—F of de-energized relay RL7 and relay contacts A—B of relay RL6.

When relay RL1 becomes energized, the inputs of the servo and control amplifiers are transferred from the initial weight sensing device S.1, to the final weight sensing device S.2. The output of the servo amplifier is also transferred from the rebalancing servomotor 82 to the control valve servomotor 100. The potentiometer R1 is connected to the servo amplifier.

The error signal from the final weight sensing device S.2 is amplified by the switching control amplifier, causing thyratrons V13 and V15 to fire and extinguishing thyratron V12. Relay RL5 energizes, relay RL8 de-energizes, and relay RL9 energizes.

When relay RL8 is de-energized, contacts E—F thereof close, thereby completing the circuit to the coil of relay RL7. Relay RL7 is energized. When slow opening relay RL7 is energized, the power to the coil of slow opening relay RL6 is removed by breaking contacts E—F of relay RL7. Relay RL7 has now taken over the function of relay RL6 in holding relay RL3 closed.

As soon as relay RL1 is energized, the error signal from the final weight sensing device S.2 is amplified by the servo control amplifier and applied to the control valve servo motor 100. The error signal causes motor 100 to run in a direction to open the material control valve. When the material control valve 92 opens, the filling material flows into the empty container 71.

At this instant, the conditions of the relays are as follows: Relay RL1 is energized; relay RL2 is de-energized; relay RL3 is energized; relay RL4 is de-energized; relay RL5 is energized; relay RL6 is de-energized; relay RL7 is energized; relay RL8 is de-energized; relay RL9 is energized; thyratron V12 is non-conducting; thyratron V13 is conducting; and, thyratron V15 is conducting.

The control valve servomotor 100 continues to run, increasing the opening of valve 92 until the voltage output of potentiometer R1, applied to the grid of vacuum tube V3, has reached a value equal to the amplitude limited error signal voltage of the final weight sensing device S.2, also applied to the grid of vacuum tube V3. Since these two voltages are 180° out of phase and of equal amplitude, they cancel each other, resulting in a zero servo amplifier output. The control valve 92 has then reached its maximum open position, preselected by appropriate adjustment of the value of resistor R15.

The filling operation continues at this maximum rate until the error signal voltage from the final weight sensing device S.2, controlled by resistor R13, falls to a value which will no longer be limited by vacuum tube V2. When the error signal falls below the limiting value, representing about 80% filling of the container, the amplitude of the output from the follow-up potentiometer results in an unbalanced voltage at the control grid of vacuum tube V3. The unbalanced voltage is amplified in the servo amplifier, causing the control valve servomotor 100 to initiate closing of valve 92.

When the error signal from the final weight sensing device S.2 has reached zero, i. e., when the output voltage of the variable linear transformer equals zero, the control valve 92 will be in an initial cut-off position predetermined by the setting of control resistor R61. The predetermined initial cut-off position of the control valve stops material flow. Thyratron V12 conducts, energizing relay RL8. The energization of relay RL8 shorts resistor R60 by closing contacts D—E thereof. The shorting of resistor R60 advances the zero output position of potentiometer R1, causing the control valve servomotor to close the material control valve beyond cut-off. The breaking of contacts E—F of relay RL8 removes the power from the coil of slow opening relay RL7, permitting it to de-energize and lock the control valve and otherwise to reset the system for the next succeeding weighing cycle. Before the control valve is locked, a time interval is provided to permit the control to sense whether the container has the desired weight, and to permit reopening of the material control valve should the container weight be improper due to erratic flow of filling material, for example.

The de-energization of relay RL7 closes contacts B—C which also short circuits resistor R60 to maintain the material control valve at its position beyond cut-off even though relay RL8 may later become de-energized. When relay RL7 is de-energized, contacts D—E are broken, removing the power from the coil of relay RL3 and permitting it to de-energize. When relay RL3 is de-energized, contacts E—F are closed and a ground is placed on the output of the limiting amplifier V2. Contacts A—B of relay RL3 are also broken, removing the power to relay RL1 and permitting it to de-energize. At the same time, contacts B—C of relay RL3 make contact, applying power to the coil of relay RL2 to energize the latter, thereby closing the circuit through ready signal 109, to inform the operator of the completion of filling.

When relay RL1 is de-energized, the inputs of the control and servo amplifiers are switched to the initial weight sensing unit S.1. Sensing unit S.1 is then providing a high output voltage because of the heavy weight of the filled container on the platform. The error voltage is amplified by the switching control amplifier and is of such a phase relationship that thyratron V14 conducts, energizing relay RL5 which has de-energized during the normal filling cycle. Thyratron V12 continues to conduct, maintaining relay RL8 in an energized condition.

The condition of all relays at the completion of the filling cycle is as folows: Relay RL1 is de-energized; relay RL2 is energized; relay RL3 is de-energized; relay RL4 is de-energized; relay RL5 is energized; relay RL6 is de-energized; relay RL7 is de-energized; relay RL8 is energized and relay RL9 is de-energized.

The ready signal is established, but closing the cycling switch P.B.1 will not recycle the control because relay RL5 is energized. As soon as the filled container is replaced with an empty container within the preselected weight limits, the control may be recycled by closing cycling switch P.B.1. The successive balancing and filling cycles are identical with the complete cycle outlined above.

The preceding discussion describes the entire operational cycle of the weighing and packaging control for an underweight container within the preselected weight limits. A similar operational cycle is effected in the instance of an overweight container within the preselected weight limits or a container equal in weight to the average weight container, with the indicated modifications.

The operation of the device will now be described by reference to the essential components of the system, omitting reference where possible to details of the amplifier circuits and switching relays in the interest of simplification.

In the initial adjustment of the mechanism, an empty container of standard weight is placed on platform 70, the tension on spring 80 is adjusted to bring the platform to a desired level, for instance, an alignment with an adjacent table or conveyor, whereupon a coarse adjustment of the weight sensing device S.1 is effected by shifting rod 88 vertically on arm 85, thereby to adjust S.1 so that its output is approximately zero. Final adjustment to this end may be effected by varying resistor R4. Variable resistor R58 may then be adjusted to establish the range of weight tolerance for the empty container.

Initial adjustment of weight sensing device S.2 is then effected by filling the standard container with the required amount by weight of the material, and displacing rod 89 with respect to arm 86 until the output of weight sensing device S.2 is reduced approximately to zero, final adjustment to zero output being effected by varying resistor R7. Meter readings may, of course, be taken to determine when zero output is reached.

Assuming that the ready signal 109 has been rendered operative at the conclusion of a net weighing and filling operation, the operator removes the filled container, places an empty container on scale platform 70, and actuates switch P.B.1. Weight sensing device S.1 thereupon emits a signal of which the magnitude and phase are determined by the difference in weight between the container on the platform and the empty container previously dealt with. Automatic adjustment of the bias on thyratrons V14 and V15 is effected by variable resistor R2 as hereinbefore explained, so that as applied to these thyratrons, the magnitude of the signal from S.1 is representative of the difference in weight between the container on the platform and a standard container. If this difference falls outside of the permissible tolerance, as determined by the initial adjustment of variable resistor R58, then relay RL5 is energized to block further operation of the mechanism until the container is replaced by one falling within the prescribed limits.

Rebalancing servomotor 82 is now operated by the signal from the servo control amplifier to an extent and in a direction determined by the magnitude and phase of the output of weight sensing device S.1 until the platform, and the container supported thereon, are displaced to the position occupied by the platform after the initial adjustment of the mechanism as hereinbefore described. When this position is reached, relay RL1 is energized to remove weight sensing device S.1 and rebalancing servomotor 82 from the circuit and to introduce weight sensing device S.2, potentiometer R1, and control valve servomotor 100. The signal from S.2 is now at a maximum value, and the signal from R1 at a minimum value, and motor 100 will therefore be energized by the output of the servo control amplifier to displace gate valve 92 to the fully opened position. Since in the fully opened position of valve 92 the signal produced by the potentiometer R1 is equal in magnitude to the signal from weight sensing device S.2, as limited by tube V2, the control valve servo motor 100 will be de-energized. Rapid filling of the container follows until a selected percentage, for instance about 80%, of the required amount of material has been charged into the container, and the signal resulting from weight sensing device S.2 has fallen to the limit imposed by the servo control amplifier.

When the initial rapid filling phase of the cycle has been completed and the signal from S.2 begins to fall below the limiting value imposed by the circuit, and below the value of the signal from potentiometer R1, servomotor 100 will be energized to initiate closing movement of valve 92. It will be appreciated that the instant of initiation of closing of the valve will be affected by the operation of differentiating circuit 120, which precedes the limiter V2 and modifies the signal from S.2 so that it varies with velocity as well as displacement of the scale pan. Thus, if we assume that the material being charged flows more freely than the average, the rate of depression of the scale pan will be increased and the signal applied to the limiter will fall more quickly, thus initiating sooner the closing of valve 92. The converse is, of course, true, in the event depression of the scale pan is slower, the differentiating circuit will act to delay the initiation of the valve closing cycle which will be accordingly delayed. Accuracy and rapidity of filling of the major portion of the container contents is thereby greatly improved.

During the closing movement of the valve, the continued discharge of the material into the container further reduces the signal from S.2, but since the signal from potentiometer R1 is concurrently reduced due to valve movement toward closed position, the difference between the two potentials remains small. If there be any irregularity in flow of the material into the container, or any inertia effect as the result of the falling of irregularly sized particles, the position of the scale platform may momentarily differ from the correct position. There is then a corresponding variation in the voltage output of S.2 relative to the voltage output of R1, and the valve movement is either accelerated or retarded momentarily. If, as a result of this fluctuation in the voltages, they become momentarily equal, the energization of the valve motor will be interrupted or, in the event of the voltage from R1 momentarily becomes less than that from S.2, the motor will be reversely energized, and in either event, the movement of the valve toward the closed position is retarded. Consequently, there is a control and adjustment of flow during the movement of the valve, which becomes increasingly important as the initial cut-off position of the valve is approached, since there is an immediate response to irregularity in the delivery of material.

It will be appreciated that the control and adjustment of flow during the valve closing cycle is greatly enhanced by the operation of the differentiating circuit 120, which is effective to alter immediately the value of the signal in response to varying conditions of filling. Thus, as is hereinbefore explained, the output of network 120 is representative of velocity as well as displacement of the scale pan, and any change in the rate of descent of the pan alters the potential applied by the network to the control grid of the next succeeding amplifier tube V20. For instance, if the movement of the scale pan is momentarily accelerated, the signal amplitude at the output of the differentiating circuit 120 is correspondingly decreased; if the scale pan is decelerated, the amplitude of the signal output of the circuit is increased. As explained, the rate at which servomotor 100 is operated to close valve 92 is determined by the resultant of the outputs from weight sensing device S.2 and potentiometer R1. If the descent of scale pan 70 is momentarily accelerated, the resultant of the outputs of S.2 and R1 is decreased, and the closing of the valve 92 is momentarily advanced. It will be obvious, therefore, that the network 120 permits substantial shortening of the period required for closing the valve without sacrifice of accuracy, which in turn allows filling of the container at the maximum rate for a greater percentage of the total filling cycle. For example, by the practice of the instant invention it becomes possible to charge into the container 90% (or more) rather than 80% of the total contents without impairment of accuracy of measurement.

It will also be perceived that the differentiating circuit 125 in the switching control amplifier is effective in increasing the speed and accuracy of the filling operation. Thus, when the error signal from the weight sensing device S.2 approaches zero, and the scale pan is descending at a velocity above average, a portion of the signal from S.2 will appear as a derivative of the initial signal, and the output of the switching control amplifier will act sooner to energize relay RL8, thereby terminating flow of material more quickly. The reverse effect is produced, of course, when, as the valve 92 approached the cut-off position, the scale platform is descending at a relatively slow rate. The overall effect is to establish more precisely the instant of termination of flow of material into the container, permitting filling at a more rapid rate without loss of accuracy, and minimizing the possibility of over-running at the end of the filling operation.

It may happen that when the initial cut-off position of the valve is reached, the precise amount of material required has not been delivered, due to irregular flow of the last increment of material, but that the relay RL8 has been energized by the momentary reduction to zero of the voltage from S.2, to effect displacement of the valve toward the beyond cut-off position, and that thereafter the platform acquires a position truly representative of the weight of material in the container and a small voltage is thus developed at S.2. The application of this voltage to thyratron V12 again de-energizes relay RL8, and the control valve servomotor is rotated in the reverse direction to open the valve slightly and thus to admit the limited quantity of material required to reduce the output of S.2 again to zero. Thereupon the relay RL8 is again energized and an additional voltage is supplied to the control valve servomotor to displace the valve to the beyond cut-off position. Thus the sensing of irregular flow or incomplete filling may occur at any stage in the cycle subsequent to the initial major portion of the cycle, for the purpose of effecting immediate correction of such irregularity or incomplete filling, up to the time the system functions to lock the control valve in the beyond cut-off or final position, to reset the circuit for the next operation, and to energize the ready signal 109.

It will be appreciated that the inventive concept described and defined herein may be readily incorporated with automatic carton feed mechanisms of conventional type, whereby filled cartons are removed and replaced by empty cartons, and whereby the intervention of an operator is made unnecessary. Thus the initiation of the net weighing and filling cycles may be effected in response to the positioning by automatic means of empty containers on the scale platform, off-size containers being removed automatically in response to operation of conventional circuits energized from relay RL5.

Again, while the invention is described, for convenience, by reference to feed mechanism especially adapted to the control of flowable material, it is equally applicable to the handling of material which requires positive feeding, for instance, by a screw conveyor or the like, the potentiometer R1 being replaced by a voltage generator such as a tachometer, constructed to deliver an output proportioned to the conveyor movement. The application of the invention to a gross weighing system of the type described in my copending patent application is obvious and need not be specifically developed herein. Various other changes in the design and function of the

Having thus described the invention, what is claimed as new and desired to be secured by Letters Patent is:

1. In apparatus for automatically delivering a predetermined weight of free flowing material from a source of supply, the combination with the source, of material feed regulating means for withdrawing material from said source, a motor, a driving connection between said motor and said feed regulating means to vary the rate of withdrawal of material between zero and a predetermined maximum rate, a scale platform receiving and being depressed by the withdrawn material, devices developing electrical signals of a magnitude varying with the height and rate of depression of said scale platform, devices developing electrical signals of a magnitude varying with the rate of withdrawal of material from said source, and means combining said signals in opposed phase relation and applying the combined signal to control said motor to (a) initiate withdrawal of material at the maximum rate during the first and major portion of the feeding cycle and (b) progressively reduce the rate of withdrawal of material substantially to zero during the latter portion of the feeding cycle, said first named devices comprising a signal generator having an output representative of the extent of depression of the scale platform, and a differentiating circuit energized by the signal output of said generator.

2. In apparatus for automatically delivering a predetermined weight of free flowing material from a source of supply, the combination with the source, of material feed regulating means for withdrawing material from said source, a motor, a driving connection between said motor and said feed regulating means to vary the rate of withdrawal of material between zero and a pre-determined maximum rate, a scale platform receiving and being depressed by the withdrawn material, devices developing electrical signals of a magnitude varying respectively with (1) the height and rate of depression of said scale platform and (2) the rate of withdrawal of material from said source, and means combining said signals in opposed phase relation and applying the combined signal to control said motor to (a) initiate withdrawal of material at the maximum rate during the first and major portion of the feeding cycle and (b) progressively reduce the rate of withdrawal of material substantially to zero during the latter portion of the feeding cycle.

3. In apparatus for automatically delivering a predetermined weight of free flowing material from a source of supply, the combination with the source, of material feed regulating means for withdrawing material from said source, a motor, a driving connection between said motor and said feed regulating means to vary the rate of withdrawal of material between zero and a pre-determined maximum rate, a scale platform receiving and being depressed by the withdrawn material, devices developing electrical signals of an effective value varying as a function of the position and rate of depression of said scale platform, and devices developing electrical signals of an effective value varying as a function of the rate of withdrawal of material from said source, and means combining said signals in opposed phase relation and applying the combined signal to control said motor to (a) initiate withdrawal of material at the maximum rate during the first and major portion of the feeding cycle and (b) progressively reduce the rate of withdrawal of material substantially to zero during the latter portion of the feeding cycle, said first named devices including means limiting the value of said first named signals during the first portion of the feeding cycle and until the value of the first named signals becomes equal to the value of the second named signals.

4. In apparatus for automatically delivering a predetermined weight of free flowing material from a source of supply, the combination with the source, of material feed regulating means for withdrawing material from said source, a motor, a driving connection between said motor and said feed regulating means to vary the rate of withdrawal of material between zero and a pre-determined maximum rate, a scale platform receiving and being depressed by the withdrawn material, devices developing electrical signals of an effective value varying as a function of the height and rate of depression of said scale platform, and devices developing electrical signals of an effective value varying as a function of the rate of withdrawal of material from said source, and means combining said signals in opposed phase relation and applying the combined signal to control said motor to (a) initiate withdrawal of material at the maximum rate during the first and major portion of the feeding cycle and (b) progressively reduce the rate of withdrawal of material substantially to zero during the latter portion of the feeding cycle, said first named devices including a signal differentiating circuit, and including means following said last named circuit for limiting the value of said first named signals during the first portion of the feeding cycle and until the value of the first named signals becomes equal to the value of the second named signals.

5. In apparatus for automatically delivering a predetermined weight of free flowing material from a source of supply, the combination with the source, of material feed regulating means for withdrawing material from said source, a motor, a driving connection between said motor and said feed regulating means to vary the rate of withdrawal of material between zero and a pre-determined maximum rate, a scale platform receiving and being depressed by the withdrawn material, devices developing electrical signals of a magnitude varying with the height and rate of depression of said scale platform, devices developing electrical signals of a magnitude varying with the rate of withdrawal of material from said source, and means combining said signals in opposed phase relation and applying the combined signal to control said motor to (a) initiate withdrawal of material at the maximum rate during the first and major portion of the feeding cycle and (b) progressively reduce the rate of withdrawal of material substantially to zero during the latter portion of the feeding cycle, said first named devices comprising a signal generator having an output representative of the extent of depression of the scale platform, a differentiating circuit energized by the signal output of said generator, and an amplitude limiter following said differentiating circuit for limiting the value of said first named signals during the first portion of the feeding cycle and until the value of the first named signals becomes equal to the value of the second named signals.

6. In apparatus for automatically delivering a predetermined weight of free flowing material from a source of supply, the combination with the source, of material feed regulating means for withdrawing material from said source, a motor, a driving connection between said motor and said feed regulating means to vary the rate of withdrawal of material between zero and a pre-determined maximum rate, a scale platform receiving and being depressed by the withdrawn material, devices developing electrical signals of an effective value varying as a function of the position and rate of depression of said scale platform, and devices developing electrical signals of an effective value varying as a function of the rate of withdrawal of material from said source, and means combining said signals in opposed phase relation and applying the combined signal to control said motor to (a) initiate withdrawal of material at the maximum rate during the first and major portion of the feeding cycle and (b) progressively reduce the rate of withdrawal of material substantially to zero during the latter portion of the feeding cycle, said first named devices including means limiting the value of said first named signals during the first portion of the feeding cycle and until the value of the first named signals becomes equal to the value of the second named signals, and means operable in response to the position and the velocity of the scale platform for terminating withdrawal of material from said source.

7. In apparatus for automatically delivering a predetermined weight of free flowing material from a source of supply, the combination with the source, of material feed regulating means for withdrawing material from said source, a motor, a driving connection between said motor and said feed regulating means, a scale platform receiving and being depressed by the withdrawn material, devices developing electrical signals of a magnitude varying with the position and rate of depression of said scale platform, and means applying said signals to control said motor to terminate withdrawal of material from said source.

8. In apparatus for automatically delivering a predetermined weight of free flowing material from a source of supply, the combination with the source, of material feed regulating means for withdrawing material from said source, a motor, a driving connection between said motor and said feed regulating means, a scale platform receiving and being depressed by the withdrawn material, devices developing electrical signals of a magnitude varying with the position and rate of depression of said scale platform, and means applying said signals to control said motor to terminate withdrawal of material from said source, said devices comprising a signal generator having an output representative of the extent of depression of the scale platform and a differentiating circuit energized by the signal output of said generator.

9. In apparatus for automatically delivering a predetermined weight of free flowing material from a source of supply, the combination with the source, of material feed regulating means for withdrawing material from said source, a motor, a driving connection between said motor and said feed regulating means, a scale platform receiving and being depressed by the withdrawn material, devices developing electrical signals of a magnitude varying with the position of said scale platform, and a circuit energized by said signals for taking a derivative thereof to produce electrical signals of a magnitude varying with the rate of depression of said scale paltform, and means applying said signals concurrently to control said motor to terminate withdrawal of material from said source.

10. In apparatus for automatically delivering a predetermined weight of free flowing material from a source of supply, the combination with the source, of material feed regulating means for withdrawing material from said source, a motor, a driving connection between said motor and said feed regulating means to vary the rate of withdrawal of material between zero and a pre-determined maximum rate, a scale platform receiving and being depressed by the withdrawn material, devices developing electrical signals of a magnitude varying respectively with (1) the position of said scale platform and (2) the rate of withdrawal of material from said source, and means combining said signals in opposed phase relation and applying the combined signal to control said motor to (a) initiate withdrawal of material at the maximum rate during the first and major portion of the feeding cycle and (b) progressively reduce the rate of withdrawal of material substantially to zero during the latter portion of the feeding cycle, devices developing electrical signals of a magnitude varying with the rate of depression of said scale platform, and means applying said last named signals to control said motor to terminate withdrawal of material from said source.

References Cited in the file of this patent

UNITED STATES PATENTS

| | | |
|---|---|---|
| 2,067,743 | Weckerly | Jan. 12, 1937 |
| 2,351,606 | Gold | June 20, 1944 |
| 2,489,899 | Kniazuk | Nov. 29, 1949 |
| 2,763,457 | Gregory | Sept. 18, 1956 |